May 26, 1959 — A. M. MOEN — 2,888,041
VALVE CONSTRUCTION
Filed June 28, 1956 — 2 Sheets-Sheet 1

INVENTOR.
ALFRED M. MOEN
BY
Robinson & Berry
ATTORNEYS

May 26, 1959 A. M. MOEN 2,888,041
VALVE CONSTRUCTION
Filed June 28, 1956 2 Sheets-Sheet 2
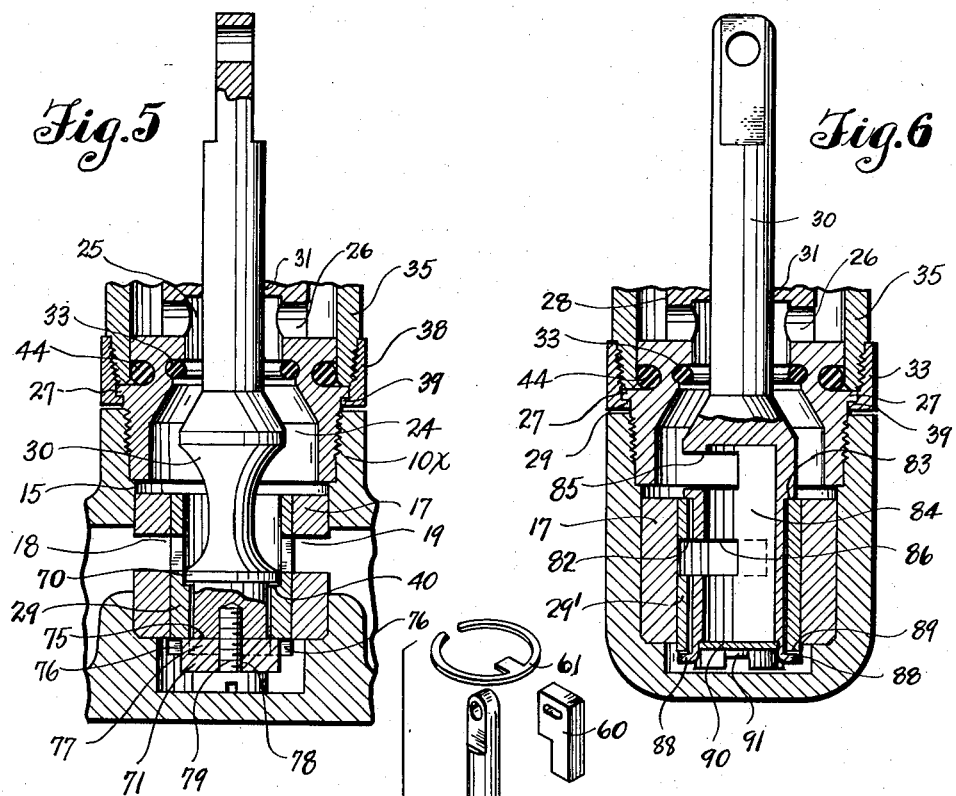
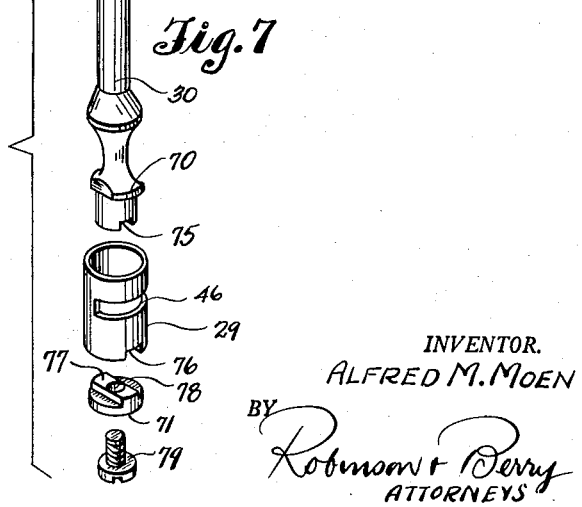
INVENTOR.
ALFRED M. MOEN
BY
Robinson & Perry
ATTORNEYS United States Patent Office 2,888,041
Patented May 26, 1959

2,888,041

VALVE CONSTRUCTION

Alfred M. Moen, Grafton, Ohio

Application June 28, 1956, Serial No. 594,598

4 Claims. (Cl. 137—636.2)

This invention relates to valves. More particularly, it has reference to valves as applied to faucets, and the like, to control the flow of a fluid or liquid medium delivered thereto under pressure.

More specifically stated, the present invention pertains to valves and their operating means as employed in mixing faucets of the types exemplified by the disclosures in my U.S. Patent No. 2,609,206 and also in a co-pending application filed on March 28, 1955, Serial No. 496,965, now Patent No. 2,757,687, of which this application is a continuation-in-part; which disclosures are characterized by valve structures wherein the movable valve member, which regulates flow and mixture, is fitted in a cylinder for both longitudinal and rotatable movement, and is equipped with an actuating stem that extends therefrom, and from the valve housing through a packing gland and nut and is connected at its outer end with a valve operating handle.

For better understanding of the present invention, it will here be noted that proper and easy adjustment and control of the movable valve member in such faucets depends, in great part, upon the absence of any binding, or any lateral pressures applied against the valve or its stem, such as might be the result of mis-alignment of the valve cylinder in which the valve operates and the packing nut through which the valve stem extends from the valve housing. In the manufacture of mixing faucets, utilizing valves of the present kind, the faucet body or housing is usually a casting which is formed with a cylindrical chamber or bore into which a machined sleeve is pressed. This sleeve forms the valve cylinder in which the movable valve member, which also is precision formed, is fitted. The movable valve member is contained in the sleeve for rotary as well as longitudinal adjustment, through the mediacy of the valve stem. The valve stem, which is of substantial length, is attached at one end to the movable valve member, while its other end portion extends through the packing gland nut for connection with the operating handle.

From the standpoint of expeditious and economical manufacture, it has been found practical to provide a certain amount of looseness in the operating connection between the valve stem and movable valve member in order to compensate for any mis-alignment of valve cylinder and stem mounting and guiding means that might result from warpage of the casting, or from any other cause including inaccuracy in machining or in the assembling of parts.

In view of the foregoing explanatory statements, it has been the principal object of the present invention to provide practical, satisfactory and economical means for operatively connecting the valve stem with the movable valve member with that looseness which will compensate for any mis-alignment of parts that could result in tightness, binding or valve adjusting difficulties, but which is entirely satisfactory for operation of the valve in its intended manner.

Specifically stated, the present invention resides in the provision of an operating connection between one end portion of the valve stem and the movable valve member that permits a relative movement between the valve and stem that may be required to compensate for possible mis-alignment of valve, its cylinder and stem mountings.

Further objects and advantages of the present invention reside in the details of construction and combination of parts, pertaining to the connection of stem and valve member, as will hereinafter be described.

In accomplishing these and other objects of the invention, I have provided the improved details of construction, the preferred forms of which are illustrated in the accompanying drawings, wherein:

Fig. 5 is a sectional view taken on the axial line of a movable valve member and its containing cylinder, showing the valve actuating stem and an alternative operating connection between stem and valve.

Fig. 6 is a similar sectional view of a modified form of valve stem and cylinder and a means for operatively connecting the stem and valve member.

Fig. 7 is a perspective view of the lower end portion of the valve stem and valve in disconnected relationship.

Figure 1:
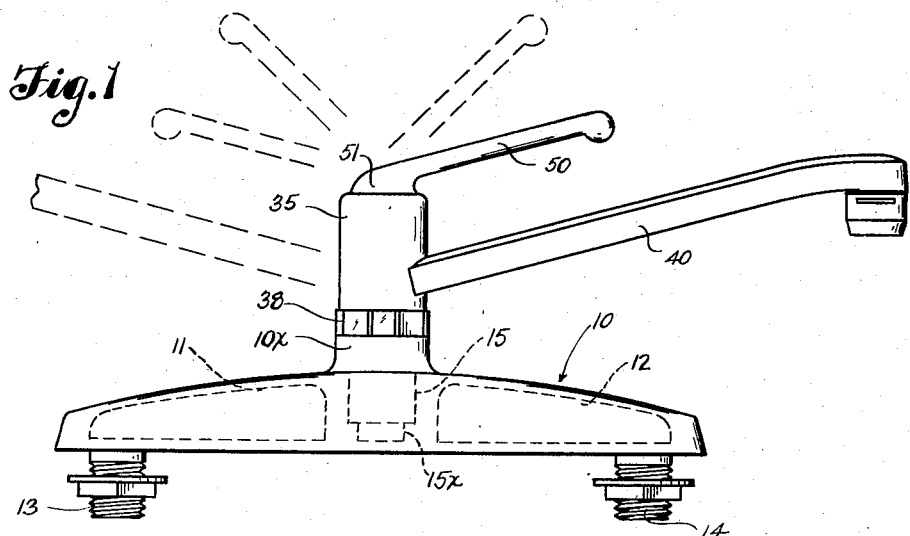
Fig. 1 is an elevation of a swing-spout faucet embodying the improvements of the present invention therein.

Referring more in detail to the drawings:

While the design of the valve or faucet housing is of no particular significance to the present invention, I have, in Fig. 1, shown the housing as designed for a sink ledge installation. In this view, 10 designates the faucet housing in its entirety and it is indicated as being formed within its opposite end portions with chambers 11 and 12 into which hot and cold water, under pressure, can be admitted from sources of supply through the nipples 13 and 14, respectively. Formed on the housing 10, centrally between its ends, is an integral, upwardly-directed portion 10x, and directed downwardly thereinto from its upper end, is a bore 15. This bore extends to near the lower side of the housing 10 where it terminates in a portion 15x of reduced diameter, thus providing an upwardly-facing annular shoulder 16.

Pressed into the bore 15, and seated at its lower end tightly against the shoulder 16, is a machined cylindrical sleeve 17 which constitutes the valve cylinder. This cylinder is formed, in its opposite sides at the same level, with inlet passages 18 and 19 through which hot and cold water is supplied from the chambers 11 and 12 to the valve as presently explained.

Threaded into the upper end of the bore 15 is a plug 20, the machined lower end surface of which is tightly seated against an annular, upwardly-facing shoulder 21 in the upper end portion of the bore 15, thus to insure a desired exactness in the extent of the threading of the plug into the bore.

The plug 20 is of substantial height above its threaded mounting in the housing 10 and is formed with an axial bore 22, leading downwardly in its upper end portion for containing a stem packing material, as at 22'. At its upper end this bore is internally threaded and has a packing gland nut 23 applied thereto. The lower end portion of the plug 20 is axially bored to provide a mixing chamber 24 which opens directly downward into the upper end of housing bore 15. At its upper end, this chamber forming bore 24 is conically tapered to an axial bore 25 from which a plurality of ports 26 open radially to the outside of the plug body. Immediately above its threaded lower end portion, the plug 20 is formed with a projecting annular flange 27. Between its ends, the plug has a portion of reduced diameter, thus providing the plug with an encircling channel 28 and it is into this encircling channel that the ports 26 open.

The valve member whereby the flow of water and mixture of hot and cold water is controlled is designated in its entirety by reference numeral 29. This member 29, which will hereinafter by referred to as the valve, is fitted for reciprocal and rotary movement in the valve cylinder 17.

Adjustment of the valve is effected through the mediacy of a valve stem 30. This stem extends longitudinally through and upwardly from the valve member 29, through the bore 25 and through a hole 31 at the bottom of the bore 22, then through the packing material 22' and nut 23.

Figure 2:
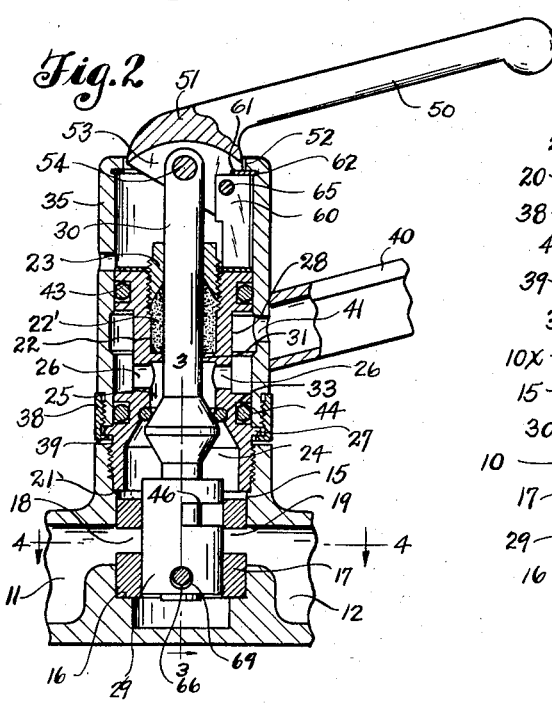
Fig. 2 is an enlarged, vertical section of the valve housing, showing the valve and its actuating stem as contained therein.

Seated in a groove 32 formed in the conical upper end surface of the chamber 24, adjacent the entrance to the bore 25, is a gasket 33 of O-ring form, against which a conical, upwardly facing valve head 34, formed on the stem 30, is adapted to be seated, as shown in Fig. 2, to check outflow of water from the chamber 24.

Enclosing the plug 20 is a tubular housing 35 which forms a mounting for the spout of the faucet. This housing fits snugly about the plug but is easily axially rotatable thereon. A securing collar 38 is threaded onto the lower end of housing 35, and this has an inturned flange 39 at its lower end engaged against the underside of the plug flange 27 to hold the housing 35 against upward lifting on the plug.

Welded to the housing 35 is a water discharge spout 40 and opening through a sidewall of the housing into the spout is a discharge port 41. Water that passes the open valve into the bore 25 will be discharged through ports 26, into the annular channel 28 and then through port 41 into the spout.

To seal the housing 35 against water leakage, the plug body is circumferentially channeled above and below the channel 28 and sealing gaskets, 43 and 44 of O-ring type, are set in the channels to contact with the walls of the housing in a water-tight joint.

Figure 3:
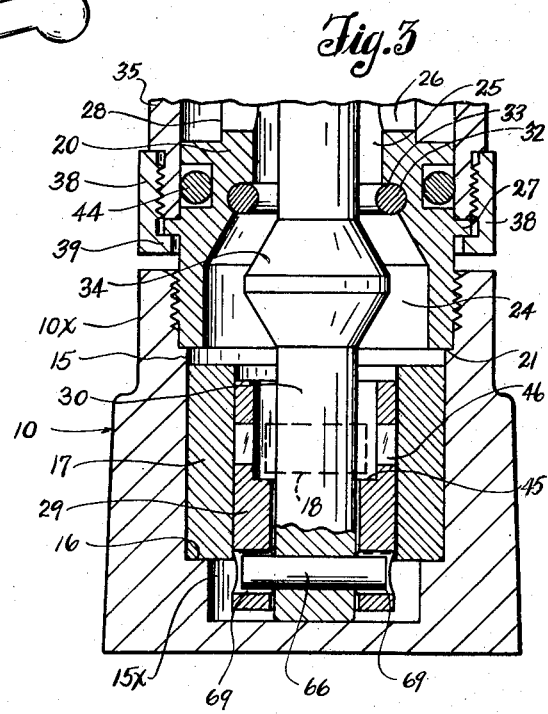
Fig. 3 is an enlarged sectional view, taken on the line 3—3 in Fig. 2, showing the connection between the valve stem and valve member.
Figure 4:
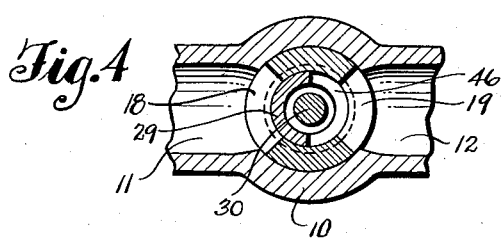
Fig. 4 is a horizontal section, taken on line 4—4 in Fig. 2.

The valve 29 is of the tubular construction shown in Fig. 3, as formed by an axial bore of two diameters, thus providing therein an annular upwardly facing shoulder 45, located slightly below the medial plane between upper and lower ends of the valve. Above this shoulder, the wall of the valve is formed with a circumferentially directed opening 46 that extends through an arc of approximately 180°. By an endwise adjustment of the valve, effected through the valve stem as presently explained, the opening 46 can be moved from a full open position, in registration with the inlet ports 18 and 19 of the valve cylinder, to a position, fully closed, and above these ports as seen in Fig. 2. Also, it may be rotatably adjusted, while in any full or partly open position, to change the effective area of the inlet ports as has been explained in my prior patent previously mentioned.

For the manual rotation and endwise adjustment of the valve stem to effect valve adjustment, I provide a hand lever 50. This is provided with a circular head 51 at its inner end fitted rotatably within a circular upper end opening 52 in the housing 35. The under face of the head has a diametric cross-channel 53 that receives the upper end portion of the valve stem 30 therein, and a pivot pin 54 is passed through the upper end portion of the stem and into the head to operatively connect the stem and lever. By swinging the lever about the axial line of the stem, the stem will be axially rotated and through its lower end connection with the valve, the valve will be rotated accordingly, thus to obtain any desired water mixture, or to obtain all cold or all hot water.

In order to adjust the stem 25 longitudinally, and thus to move the valve longitudinally to control volume of flow or to close the valve, I have provided a fulcrum block 60 as shown in Fig. 2, that is contained in the upper end of the housing 35 between the stem and housing wall. This block rests at its lower end on the upper surface of the plug 20 and is slidable thereon. It has its upper end fitted within the cross channel 53 in the underside of the lever head 51 and is held against upward lifting by means of a split ring-like washer 61 that is snapped into an annular channel 62 cut in the inside surface of the housisng adjacent its upper end. Thus, when the hand lever is swung from side to side, its head rotates accordingly and the fulcrum block moves with it. The upper end of the block is attached to the head 51 by a pivot pin 65 which is eccentric of the stem.

The present invention resides primarily in the provision of means for and manner of securing the valve member 29 to the lower end of the stem 30 in a flexible and operative connection. One means will now be described, particularly in reference to the showing in Figs. 2 and 3. Here it is shown that the lower end portion of the valve stem 30 extends downwardly through the valve, passing through the end bore of lesser diameter with slight clearance. Projecting diametrically through the lower end portion of the stem, is a pin 66, disposed with its opposite end portions contained, with clearance, in holes 69—69 formed in horizontal alignment through the lower end of the valve 29. Thus, an operating connection between stem and valve is provided. This connection is sufficiently loose to permit whatever relative movement of these parts is necessary, but without excessive looseness.

In Fig. 5, I have illustrated an alternative operating connection between valve stem 30 and valve 29. In this, the valve construction is substantially as previously described. The stem extends, with slight clearance, through the lower end portion of the valve bore as previously explained. Formed on the stem, to engage the upwardly facing shoulder 40 are projecting, downwardly facing shoulders 70. These are freely contained within the portion of larger diameter of the bore. Secured to the lower end of the stem is a flat button 71 which is designed to function as a means for locking and holding the valve against turning or longitudinal movement relative to the stem. This is accomplished by means as follows:

Formed in the lower end surface of the stem 30, diametrically thereacross, is a channel 75. Likewise, formed in the lower end of the valve 30 at diametrically opposite points, are recesses 76. The recesses are designed to be aligned or registered with the opposite ends of the channel 75 when the parts are assembled. Formed diametrically across the top surface of the button, is a rib 77 and centrally of the button is a hole 78 for the reception of a securing bolt 79.

In assembling these parts, the stem 30 is first extended down into the valve 29 and the shoulders 70 thereon seated against the upwardly facing shoulder in the valve. Then the valve is turned to register the recesses 76 therein with the ends of the channel across the lower end of the stem. Then the button is applied by seating the cross rib thereof in the channel 75 and recesses 76. Then the securing bolt is applied upwardly through the hole in the bottom and is threaded into the end of the stem as shown. The button thus is drawn tightly against the stem, and holds the valve secured to the stem against any relative rotation but with some freedom of movement thereon for self-alignment purposes as applied to the valve.

In Fig. 6, I have illustrated another alternative, or a modified form of construction, like that of Fig. 5 in most respects but differing in details of valve and stem structure. It includes the valve cylinder 17 and a valve 29', with one diameter bore, and formed with a circumferential inlet 82. The lower end of the valve stem is not reduced in diameter below the conical head as in Fig. 2, but is continued at the full diameter of the head to the valve, and is there just slightly reduced to form a downwardly-facing shoulder 83 and then is continued coaxially through the valve sleeve in a loose fit. The lower end of the stem is formed with a central bore 84 that extends upwardly into the conical head portion. A slot 85 is cut through the hollow portion of the stem above the valve to cause the upper end of bore 84 to open into the mixing chamber of plug 20. The tubular lower end portion of the stem also is formed with a sidewall opening 86 registered with the valve opening 82. The stem and valve are locked together by the seating of the upper end of the tubular valve against the stem shoulder 83 and by means of ears 88 out-turned from the lower end of the stem to engage in notches 89 formed in the lower end edge of the valve 29'. The lower end of the bore of the stem is closed by a disk or plate 90 that is fitted therein and secured by ears 91 that are inturned from opposite sides of the lower end of the stem.

In this device, water that enters the valve flows directly into the stem bore, and out from the upper end thereof through the side opening 85. The control of flow of water is otherwise accomplished in the same manner as in the device of Fig. 2 by the up and down movement and rotative adjustment of the valve as accomplished by the stem.

In each of these connections, there is limited freedom of movement of the connected parts relative to each other which will provide for an automatic adjustment whereby the binding tightness or resistance to easy movement, that results from misalignment or inaccuracies in machining, is avoided.

By the provision of such freedom of movement between valve and stem, the exactness in machining of parts to extremely close tolerances to insure exactness in alignment of parts when assembled, is not required. Thus the expense of manufacture is reduced without any lessening of the efficiency of the valve. This slight freedom of movement in the connection also compensates for misalignment that may be the result of warping of the valve casting. In this connection, it is also desired to point out that the valve might be fitted for movement in a bored cylinder in the housing, and the sleeve 17 eliminated.

The slight clearance between the valve stem 30 and the smaller axial bore of the valve 29 is less than the clearance between the pin 66 and the holes 69—69. Such slight clearance allows coaxial misalignment or cocking of the valve stem with relation to the valve sleeve without binding the pin in the holes and preventing the drive connection between the valve stem, pin and valve in all movements of the same. Although the foregoing has been described in connection wtih the showing in Fig. 3, the same slight clearance and clearance are also shown in connection with the modifications in Figs. 5, 6 and 7.

What I claim as new is:

1. A valve structure comprising a cylindrical chamber having water inlets in its side wall between its ends, a centrally located outlet at one end of the chamber, a movable valve sleeve in the chamber below the outlet and extending across said water inlets, said sleeve having an open end directed toward said outlet and a side wall opening thereinto and spaced from the opposite ends of the sleeve, a sleeve actuating stem extending into the sleeve through the outlet thereof with a passage for flow of water through the side wall opening of the sleeve to the outlet thereof, the stem extending to adjacent the lower end of the sleeve, driving means interconnecting the stem to the lower end of the sleeve to rotate and to move longitudinally the sleeve to control the flow and mixing of the water, the sleeve and a part of the stem having an axial clearance therebetween, the driving means and the sleeve having a clearance therebetween transverse the axis of the sleeve, the axial clearance being of a lesser degree than the transverse clearance so that any coaxial misalignment of the stem within the chamber will take up the axial clearance before causing any binding action on the drive means between the stem and sleeve, and a handle mounted in the housing and secured to the upper end of the stem whereby the movement of the handle produces corresponding movement of the sleeve through the interconnection provided by the stem.

2. The valve structure as set forth in claim 1 wherein the driving means comprises a pin fixed in said lower end portion of the stem and having and end portion thereof extending radially from the stem and said valve having a hole in the wall thereof containing the extended end portion of said pin with a clearance between the pin and hole in the valve.

3. The valve structure as set forth in claim 1 wherein the driving means comprises the lower end of the valve stem having a slot therein and the valve sleeve having diametrically opposed slots therein and a ribbed button, the ribbed portion being received within the slots of the valve stem and valve and the button held to the valve by a fastening means, the clearance being between the ribbed portion and the slots in the valve.

4. The valve structure as recited in claim 1 wherein the valve stem is hollow and is fitted within the sleeve, the valve stem having a side wall opening therein to coincide with the side wall opening in the valve sleeve for the admission of water and the upper part of the stem adjacent the upper end of the valve sleeve having an opening for the emission of the water and the driving means comprising ears on the lower end of the stem positionable at right angles to the stem, the valve sleeve having notches formed in its lower end surface for receiving the turned over ears with the clearance being between the ears and the notches.

References Cited in the file of this patent

UNITED STATES PATENTS

| | | |
|---|---|---|
| 1,224,090 | Lavigne | Apr. 24, 1917 |
| 1,507,973 | Mohn | Sept. 9, 1924 |
| 1,882,953 | Salzler | Oct. 18, 1932 |
| 1,991,621 | Noll | Feb. 19, 1935 |
| 2,028,844 | Pope | Jan. 28, 1936 |
| 2,373,702 | Moen | Apr. 17, 1945 |
| 2,609,206 | Moen | Sept. 2, 1952 |
| 2,630,136 | Brandes | Mar. 3, 1953 |